US 6,973,199 B2

(12) United States Patent
Farina

(10) Patent No.: US 6,973,199 B2
(45) Date of Patent: Dec. 6, 2005

(54) SPRAY DATA ANALYSIS AND CHARACTERIZATION SYSTEM

(75) Inventor: Dino J. Farina, Waltham, MA (US)

(73) Assignee: Image Therm Engineering, Inc., Sudbury, MA (US)

( * ) Notice: Subject to any disclaimer, the term of this patent is extended or adjusted under 35 U.S.C. 154(b) by 0 days.

(21) Appl. No.: 10/666,916

(22) Filed: Sep. 19, 2003

(65) Prior Publication Data

US 2004/0131243 A1    Jul. 8, 2004

Related U.S. Application Data

(63) Continuation of application No. 09/640,346, filed on Aug. 16, 2000, now Pat. No. 6,665,421.

(60) Provisional application No. 60/149,171, filed on Aug. 17, 1999.

(51) Int. Cl.[7] ............................................. G06K 9/00
(52) U.S. Cl. ........................ 382/100; 356/436; 250/573
(58) Field of Search ............................... 382/100, 152, 382/203, 270; 356/436, 437, 438, 439; 250/564, 250/573, 577; 700/283

(56) References Cited

U.S. PATENT DOCUMENTS

| | | | |
|---|---|---|---|
| 4,357,670 A | 11/1982 | McFarlane | 364/510 |
| 4,415,265 A | 11/1983 | Campillo et al. | 356/338 |
| 4,614,300 A | 9/1986 | Falcoff | 239/71 |
| 4,965,841 A | 10/1990 | Kaneko et al. | 382/1 |
| 4,992,952 A | 2/1991 | Sasaki | 364/510 |
| 5,075,014 A | 12/1991 | Sullivan | 210/747 |
| 5,337,926 A | 8/1994 | Drobish et al. | 222/309 |
| RE34,910 E | 4/1995 | Funkenbusch et al. | 210/198.2 |
| 5,561,527 A | 10/1996 | Krone-Schmidt et al. | 356/414 |
| 5,879,713 A | 3/1999 | Roth et al. | 424/489 |
| 6,149,071 A | 11/2000 | MacCallumMhor et al. | 239/67 |
| 6,193,936 B1 | 2/2001 | Gardner et al. | 422/186 |
| 6,256,597 B1 | 7/2001 | Wang et al. | 703/2 |
| 6,508,112 B1 | 1/2003 | Verhoeven | 73/119 A |

OTHER PUBLICATIONS

"Guidance for Industry—Bioavailability and Bioequivalence Studies for Nasal Aerosols and Nasal Sprays for Local Action (Draft Guidance)," FDA, Jun. 1999.*

Cummings et al., "Comparison of Spray Pattern Plume Geometry and Droplet Sizing by Light-Scattering for Characterization of Nasal Inhalers," *Respiratory Drug Delivery V*, 1996, pp. 320-322.*

Eck et al., "Plume Geometry and Particle Size Measurements as a Product Development Tool," *Respiratory Drug Delivery VI*, 1998, pp. 291-295.*

(Continued)

*Primary Examiner*—Andrew W. Johns
(74) *Attorney, Agent, or Firm*—Hamilton, Brook, Smith & Reynolds P.C.

(57) ABSTRACT

A method of and system for analyzing image data representative of a sequential set of images of a spray plume, each of the images being representative of a density characteristic of the spray plume (i) along a geometric plane that intersects the spray plume, and (ii) at a predetermined instant in time, that in one aspect comprises sequentially displaying the set of images so as to exhibit a time evolution of the spray plume along the geometric plane. The invention may further integrate the set of images so as to exhibit a time-average representation of the images. In one embodiment, the invention comprises a general purpose computer executing software that receives and sequentially displays the set of images so as to exhibit a time evolution of the spray plume along the geometric plane, and provides a user interface for measuring one or more spray plume parameters associated with the spray plume within one or more of the images.

48 Claims, 6 Drawing Sheets

OTHER PUBLICATIONS

Sellens, Rick and Deljouravesh, Rama, "Non-Orthogonal Optical Spray Pattern Analysis," *Ninth International Symposium on Applications of Laser Techniques to Fluid Mechanics*, Lisbon, Portugal, Jul. 1998.

Sankar, S.V., et al., "Time-Resolved Measurement of Liquid Mass Distribution in a Fuel Injector Spray Using an Optical Patternator,"*Institute for Liquid Atomization and Spray Systems, ILASS Americas '97*, pp. 266-270, Ottawa, ON, Canada, May 18-21, 1997.

Wang, G., et al., "An Optical Spray Pattern Analyzer," *Institute for Liquid Atomization and Spray Systems, ILASS Americas '97*, pp. 261-265, Ottawa, ON, Canada, May 18-21, 1997.

Dvorak, P., "How to See Aerosol Spray Patterns and Plumes," *Machine Design*, 72(13): 122 (Jul. 6, 2000).

Badreldin, Amira M., "Real-Time Analysis of Fuel Spray Images," *Proc. IEEE Int. Conf. On Acoustics, Speech, and Signal Processing*, Ap. 1987, vol. 12, pp. 622-624.

Lopera,, et al., "Improved Entropic Edge-Detection." *Proc. Int. Conf. On Image Analysis and Processing*, Sep. 1999.

Pastor, J. V., et al., "Analysis Methodology of Diesel Spray and Flame by Means of In-Cylinder Endoscopic Imaging," *Proc. IEE Seminar on Advanced Sensors and Instrumentation Systems for Combustion Processes*, Jun. 2000, pp. 13/1-13/4.

\* cited by examiner

SPRAY DATA ANALYSIS AND CHARACTERIZATION SYSTEM

RELATED APPLICATIONS

This application is a continuation of U.S. application Ser. No. 09/640,346, filed on Aug. 16, 2000, U.S. Pat. No. 6,665,421, which claims the benefit of U.S. Provisional Application No. 60/149,171, filed on Aug. 17, 1999. The entire teachings of the above applications are incorporated herein by reference.

This application is related to U.S. application Ser. No. 09/640,246 of common assignee, "Spray Data Acquisition System", inventor Dino J. Farina, filed on Aug. 16, 2000, which claims the benefit of U.S. Provisional Application No. 60/149,281, filed on Aug. 17, 1999. The entire teachings of the above applications are incorporated herein by reference.

BACKGROUND OF THE INVENTION

The present invention relates to the field of aerosol spray characterization, and more particularly, to computer assisted methods of analyzing and characterizing a set of sequential images corresponding to the progression of an aerosol spray.

The fluid dynamic characterization of the aerosol spray emitted by metered nasal spray pumps and metered dose inhalers is crucial in determining the overall performance of the inhaler as a drug delivery device ("DDD"). In addition to treating direct respiratory ailments, inhaler-based DDDs are now increasingly being used to deliver drugs such as flu vaccines, insulin and migraine headache relievers because they deliver their dose of medication to tissues that can more efficiently absorb the drug and bring relief to patients more conveniently. Spray characterization is also an integral part of the regulatory submissions necessary for Food and Drug Administration ("FDA") approval of research and development, quality assurance and stability testing procedures for new and existing inhaler-based DDDs.

Thorough characterization of the spray's geometry has been found to be the best indicator of the overall performance of most inhaler-based DDDs. In particular, measurements of the spray's divergence angle (plume geometry) as it exits the device; the spray's cross-sectional ellipticity, uniformity and particle/droplet distribution (spray pattern); and the time evolution of the developing spray have been found to be the most representative performance quantities in the characterization of an inhaler-based DDD.

During research and development, these measurements are typically used to optimally match the spray pump's performance characteristics with the fluid properties of the liquid/solid medicine solution, resulting in a more cost-effective and efficient product design. However, accurate, reliable and easy-to-use protocols and a system for inhaler-based DDD spray characterization do not exist. During quality assurance and stability testing, plume geometry and spray pattern measurements are key identifiers for verifying consistency and conformity with the approved data criteria for the inhaler-based DDD.

The currently adopted inhaler spray testing standard that is in use today at pharmaceutical companies involves firing the spray pump at a solid, thin-layer chromatography ("TLC") plate having a coating that fluoresces in response to incident ultraviolet ("UV") radiation. The TLC plate is positioned at a fixed height above the exit port of the pump. The pattern of the spray deposited on the plate is then analyzed.

In a conventional test configuration, the analysis of an exposed plate begins with illumination of the plate with UV radiation. The incident UV radiation causes the plate's coating to fluoresce and helps to highlight the outline of the spray pattern. Marking instruments and mechanical calipers are then used to draw and measure an outline of the deposited patterns on the plate. Measurements of the spray pattern's ellipticity in terms of major-and minor-diameters are recorded.

One disadvantage to this configuration is that the presence of the TLC plate radically alters the natural fluid dynamics of the spray causing it to switch from a free aerosol jet to an impinging jet.

Another disadvantage to this configuration is that a large of amount of the spray particles bounce off the plate, causing artifacts in the pattern that do not exist in an unconstrained spray. This is especially problematic for dry powder-based DDDs because the particles don't tend to stick to the TLC plate at all causing artificially low spray pattern densities to be measured and reported.

Yet another disadvantage to this configuration is that the measurements of the spray pattern are very sensitive to the operator's judgement and prone to low reliability.

A further disadvantage to this configuration is that the associated measurement technique is restricted to measurements only of the static aspects of the spray pattern; it cannot be used to investigate any time-evolving or plume geometry properties of the spray.

It is an object of the present invention to substantially overcome the above-identified disadvantages and drawbacks of the prior art.

SUMMARY OF THE INVENTION

The current invention provides an imaging and analysis system that receives information representative of the time evolution of an aerosol spray, displays individual and sequential images of the spray with respect to various observation angles, and characterizes parameters relating to the spray, such as the spray plume central axis, divergence angle and cross-sectional uniformity and ellipticity. In a preferred embodiment, the imaging and analysis system includes software running on a general purpose computer system.

The foregoing and other objects are achieved by the invention which in one aspect comprises a method of analyzing image data representative of a sequential set of images of a spray plume, each of the images being representative of a density characteristic of the spray plume (i) along a geometric plane that intersects the spray plume, and (ii) at a predetermined instant in time. The method includes sequentially displaying the set of images so as to exhibit a time evolution of the spray plume along the geometric plane, and measuring one or more spray plume parameters associated with the spray plume within one or more of the images.

In another embodiment of the invention, the one or more parameters includes the central axis of the spray plume.

In another embodiment of the invention, the one or more parameters further includes an angle measured from the central axis of the spray plume to an outer boundary of the spray plume.

In another embodiment of the invention, the one or more parameters includes one or more cross-sectional axes of the spray plume.

Another embodiment of the invention further includes superimposing a shape upon the one or more images so as to delineate an area of the spray plume, and measuring one or more spray plume parameters within the area.

In another embodiment of the invention, the spray plume parameters are selected from the group consisting of area start X and Y coordinates, area end X and Y coordinates, area width, area height, mean spray intensity, spray standard deviation, minimum spray intensity, maximum spray intensity, and spray intensity histogram.

Another embodiment of the invention further includes superimposing a line upon the one or more images so as to delineate an axis of the spray plume, and measuring one or more spray plume parameters along the axis.

In another embodiment of the invention, the spray plume parameters are selected from the group consisting of axis start X and Y coordinates, axis end X and Y coordinates, axis length, axis width, axis height, axis angle, mean spray intensity, spray standard deviation, minimum spray intensity, maximum spray intensity, and spray intensity profile.

Another embodiment of the invention further includes inserting one or more calibrating components associated with displaying the images so as to associate physical coordinates with image coordinates within each of the set of images.

Another embodiment of the invention further includes integrating the set of images so as to exhibit a time-average representation of the images, and measuring one or more parameters of the time average representation.

In another embodiment of the invention, the time-average representation of images corresponds to an axial cross-sectional density characteristic along a geometric plane substantially normal to a flow direction centerline, such that the step of integrating produces a cross-sectional spray pattern image.

In another embodiment of the invention, the time-average representation of images corresponds to a longitudinal density characteristic along a geometric plane substantially parallel to and intersecting the flow direction centerline, such that the step of integrating produces a longitudinal plume image.

Another embodiment of the invention further includes subtracting a first in time image of the set of images from the time-average representation, so as to remove one or more common image components of the set of images from the time average representation.

In another aspect, the invention comprises a system for analyzing image data representative of a sequential set of images of a spray plume, each of the images being representative of a density characteristic of the spray plume (i) along a geometric plane that intersects the spray plume, and (ii) at a predetermined instant in time. The system includes a processing device for receiving the set of images, and sequentially displaying the set of images so as to exhibit a time evolution of the spray plume along the geometric plane. The system further includes a controller, associated with the processing device, that provides a user interface for controlling the processor to measure one or more spray plume parameters associated with the spray plume within one or more of the images.

In another embodiment of the invention, the one or more parameters includes the central axis of the spray plume.

In another embodiment of the invention, the one or more parameters further includes an angle measured from the central axis of the spray plume to an outer boundary of the spray plume.

In another embodiment of the invention, the one or more parameters includes one or more cross-sectional axes of the spray plume.

In another embodiment of the invention, the controller further (i) superimposes a shape upon the one or more images so as to delineate an area of the spray plume, and (ii) measures one or more spray plume parameters within the area.

In another embodiment of the invention, the spray plume parameters are selected from the group consisting of area start X and Y coordinates, area end X and Y coordinates, area width, area height, mean spray intensity, spray standard deviation, minimum spray intensity, maximum spray intensity, and spray intensity histogram.

In another embodiment of the invention, the controller further (i) superimposes a line upon the one or more images so as to delineate an axis of the spray plume, and (ii) measures one or more spray plume parameters along the axis.

In another embodiment of the invention, the spray plume parameters are selected from the group consisting of axis start X and Y coordinates, axis end X and Y coordinates, axis length, axis width, axis height, axis angle, mean spray intensity, spray standard deviation, minimum spray intensity, maximum spray intensity, and spray intensity profile.

Another embodiment of the invention further includes one or more calibrating components for associating physical coordinates with image coordinates within each of the set of images.

In another embodiment of the invention, the processor further integrates the set of images so as to exhibit a time-average representation of the images, and measuring one or more parameters of the time average representation.

In another embodiment of the invention, the time-average representation of images corresponds to an axial cross-sectional density characteristic along a geometric plane substantially normal to a flow direction centerline, such that the step of integrating produces a cross-sectional spray pattern image.

In another embodiment of the invention, the time-average representation of images corresponds to a longitudinal density characteristic along a geometric plane substantially parallel to and intersecting the flow direction centerline, such that the step of integrating produces a longitudinal plume image.

In another embodiment of the invention, the processor further subtracts a first in time image of the set of images from the time-average representation, so as to remove one or more common image components of the set of images from the time average representation.

In another embodiment of the invention, the processing device includes a computer system executing software operative to analyze the image data.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

The spray data analysis and characterization system of the present invention receives data representative of a sequential set of images of a spray plume. Each of the images is preferably representative of a density characteristic of said spray plume (i) along at least one geometric plane that intersects the spray plume, and (ii) at a predetermined instant in time.

In one preferred embodiment, one of the geometric planes includes the flow-direction centerline of the spray plume (also referred to herein as the central axis of the spray plume), and one of the geometric planes is perpendicular to the central axis, although the present invention may be used to analyze other planes through the plume. Using the sequential set of images, the system displays a time-evolution of the plume from inception to dissipation, and derives physical parameters of the of the plume, such as particle distribution and divergence angle of spray patterns. In general, the system provides information regarding time-evolution of the transient spray plume; it time-averages the 100+ images typically acquired in a short-duration spray test; it facilitates visualization and measurement of the spray pattern depicted in the image sequence, and facilitates visualization and measurement of the spray plume geometry.

Figure 1:
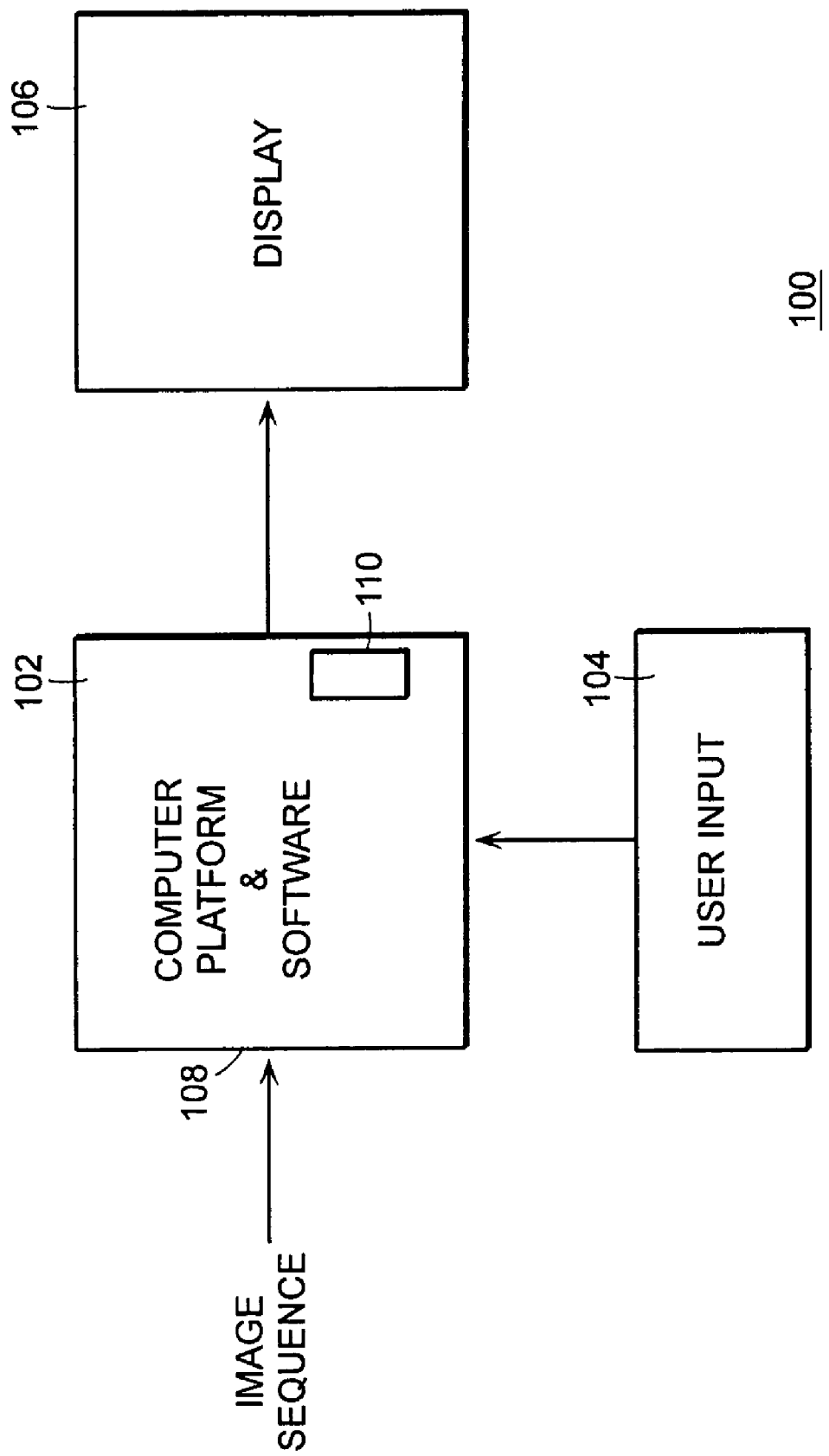
FIG. 1 illustrates a block diagram of a spray data analysis and characterization system according to the present invention.

FIG. 1 illustrates a block diagram of a spray data analysis and characterization system 100 according to the present invention. The system 100 includes a computer platform 102, a user input terminal 104, a display 106, an image input port 108, and system software 110. The software 110 resides in memory that is part of the computer platform 102. The computer platform is preferably a general purpose computer, such as a PC type computer or a workstation, although other embodiments may include other types of computer platforms known to those in the art (e.g., an application-specific device dedicated to the spray data analysis and characterization described herein). In one preferred embodiment, the computer platform 102 includes an Intel Pentium-based computer system running a Windows NT 4.0 operating system. The user terminal 104 may include a keyboard, a mouse, and/or other user input devices known to those in the art.

Figure 1A:
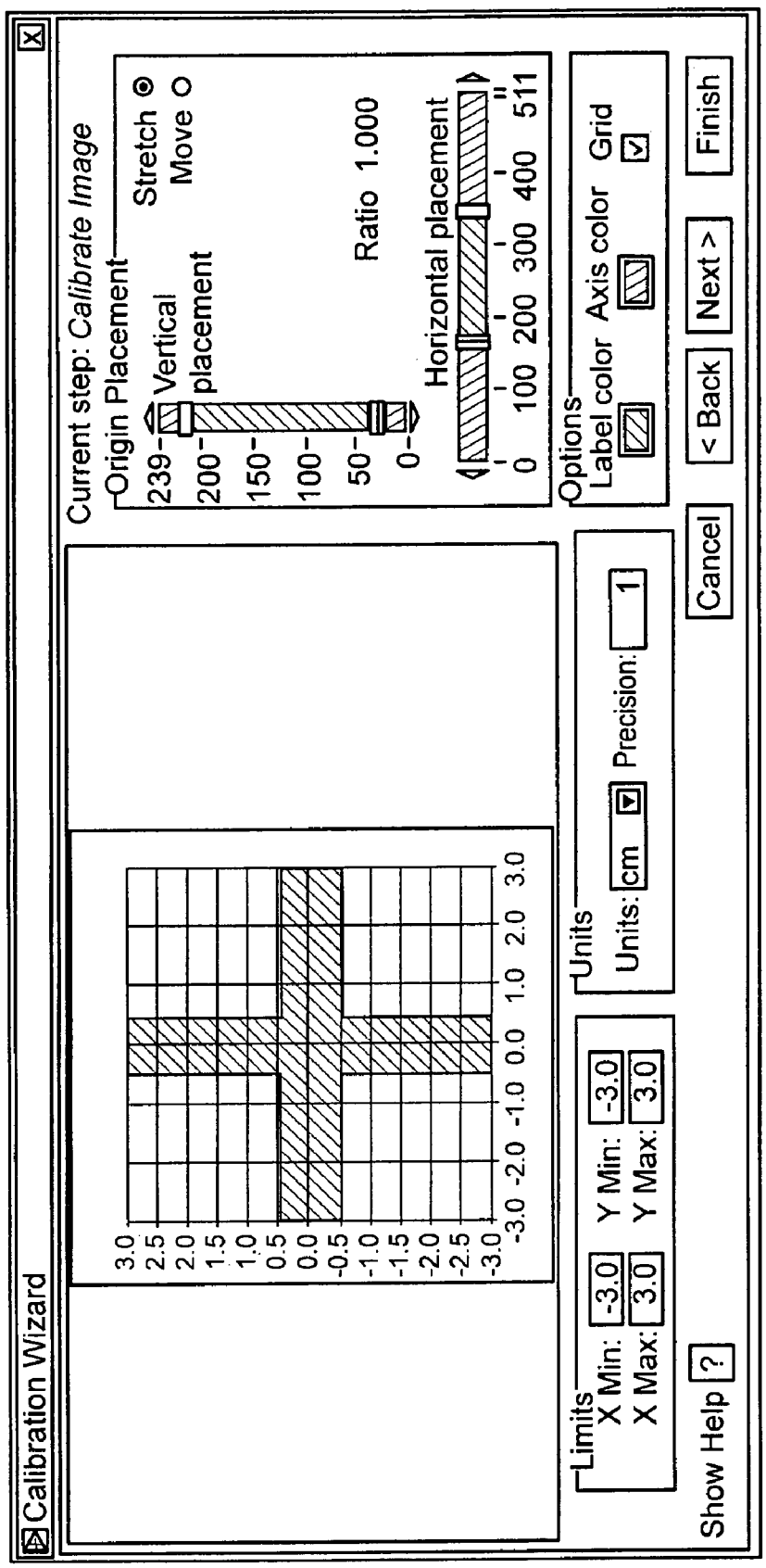
FIG. 1A illustrates a calibration image within a user interface display for assigning calibration parameters and other information to the image.

The data representative of a sequential set of images of a spray plume preferably includes data for spatial calibration so that a user can associate real physical coordinates (e.g., mm, cm, inches, etc.) with image coordinates (e.g., pixels). A calibration image may be used for this purpose, although other calibration methods known to those in the art may also be used. FIG. 1A illustrates one preferred calibration image within a user interface display for assigning calibration parameters and other information to the image. Further, the calibration image may be used to correct for perspective distortions due to less than ideal placement of the image acquisition equipment used to acquire the image sequence. The calibration parameters may be modified once the calibration image has been entered into the system. The values of Xmin, Ymin, and the position of the of the reference axes may be varied, and the system automatically adjusts all of the spatial measurements accordingly.

Figure 2:
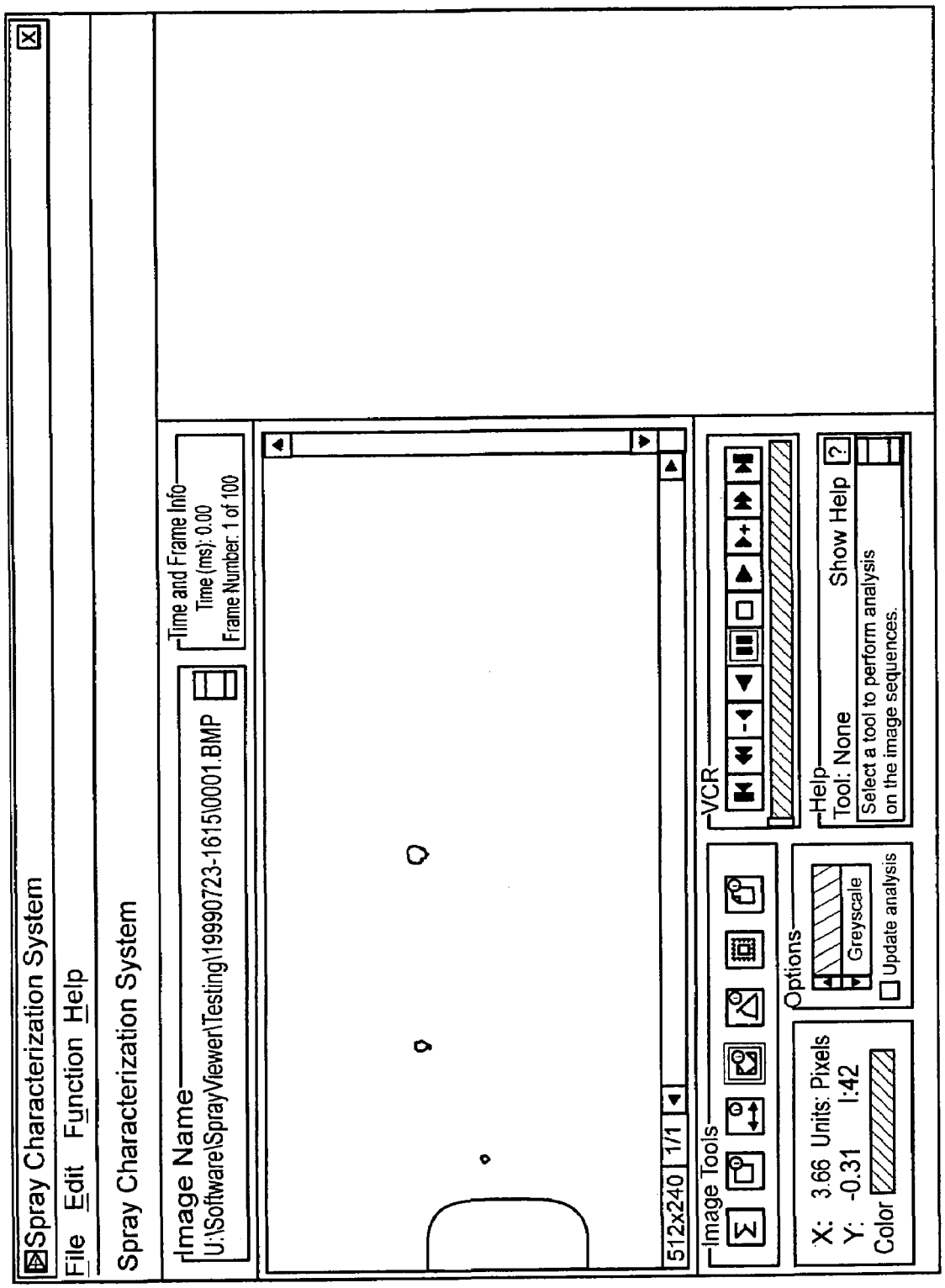
FIG. 2 shows the VCR-like controls for manipulating the sequential set of spray plume images.

In a preferred embodiment, the system manipulates the sequential set of spray plume images via VCR-like controls, as illustrated in FIG. 2. Through the use of these controls, the image sequence may be displayed forward and backward, and at fast or normal speeds. Fast speed plays the images back as fast as possible where normal plays them back with a predetermined delay (e.g., 300 ms) between the individual images (frames). These VCR-like controls enable a frame-by-frame progression through the sequence for pinpoint accuracy, and for easy visualization of the time evolution and spatial development of the spray.

The analysis and characterization system further provides a time-average image (also referred to as a summary image) of the spray by collapsing all of the images in the sequence into one frame. The result is a single image that is representative of the time-average of the all the images. In practical terms, the time-average represents the fluid dynamic streak-lines of the spray or the trajectory of the particles as they move in time. In photographic terms it is equivalent to a time-lapse photo (e.g., well known photos of automobiles moving through traffic at night with their head- and tail-lights forming the streak-lines). For spray characterization, this representation of the images facilitates quantitative measurements of the plume geometry and spray patterns much more accurately and more representative of the average trajectory of spray particles.

Figure 3:
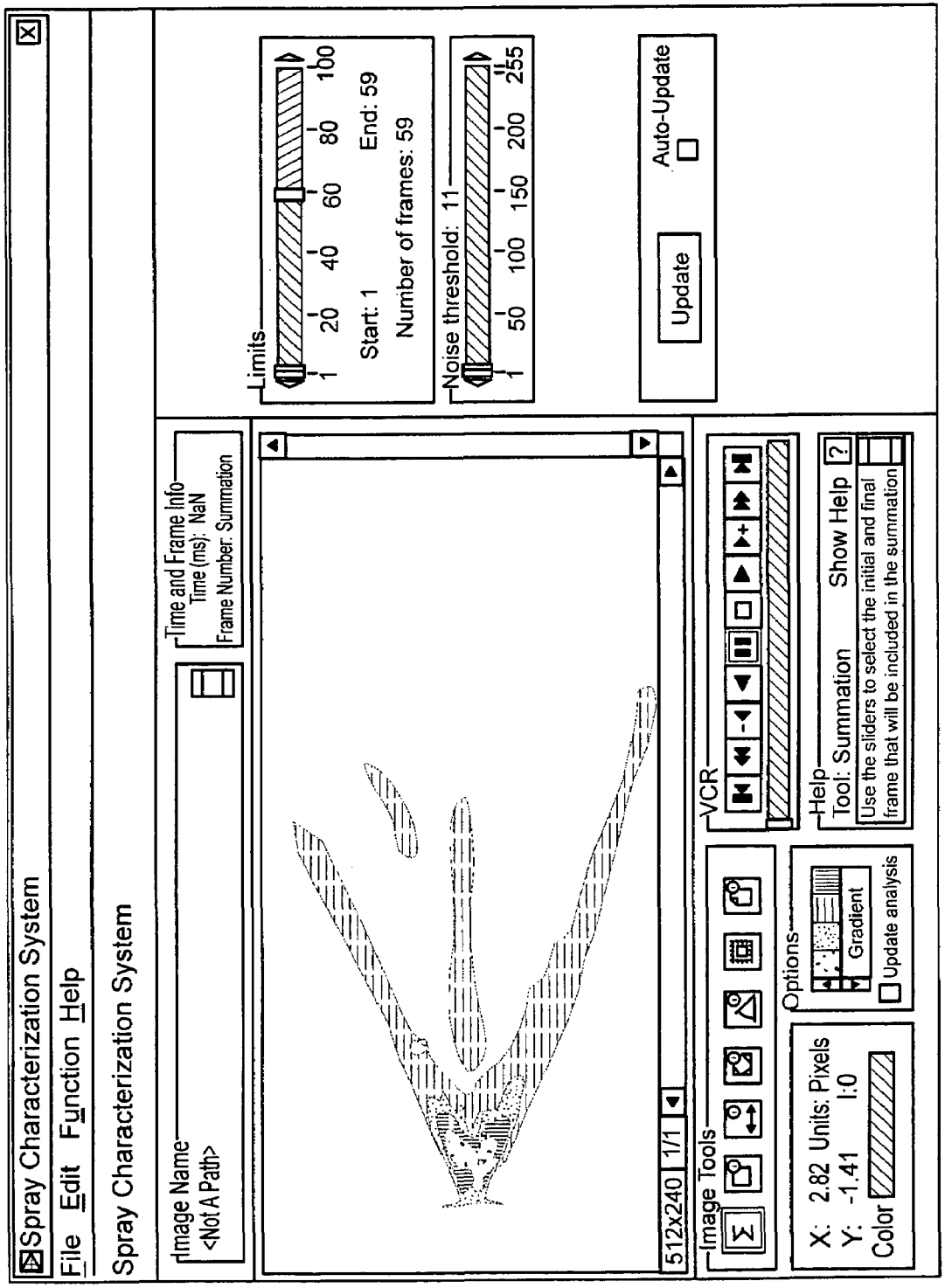
FIG. 3 illustrates one embodiment of a user-interface screen for setting the parameters of a time-average image.

FIG. 3 illustrates one embodiment of a user-interface screen for setting the parameters of a time-average image. Such parameters may include, but are not limited to, (i) the images to be included in the sum and (ii) a noise threshold level. The included images are selected with a Limits Control, which automatically display the Start, End and Number of Frames that have been selected. The Limits Control makes it possible to process only the images in the sequence that display active spray particles, and to ignore the others. The Noise Threshold control makes it possible to remove background noise (or particles that have intensity levels lower than the threshold specified) from the process and this leads to cleaner time-averages with better isolation of the actual spray particles from the background.

In one embodiment, the system automatically subtracts the first frame of the sequence (i.e., prior to any spray droplets being ejected from the spray nozzle) from images in the time-average, thus removing that static (or common) portions of each image, resulting in a much more clear and accurate time-average. For example, the spray nozzle is constant and does not vary from image to image. By subtracting the first image from the rest of the images, the nozzle is essentially removed from the image.

Figure 4:
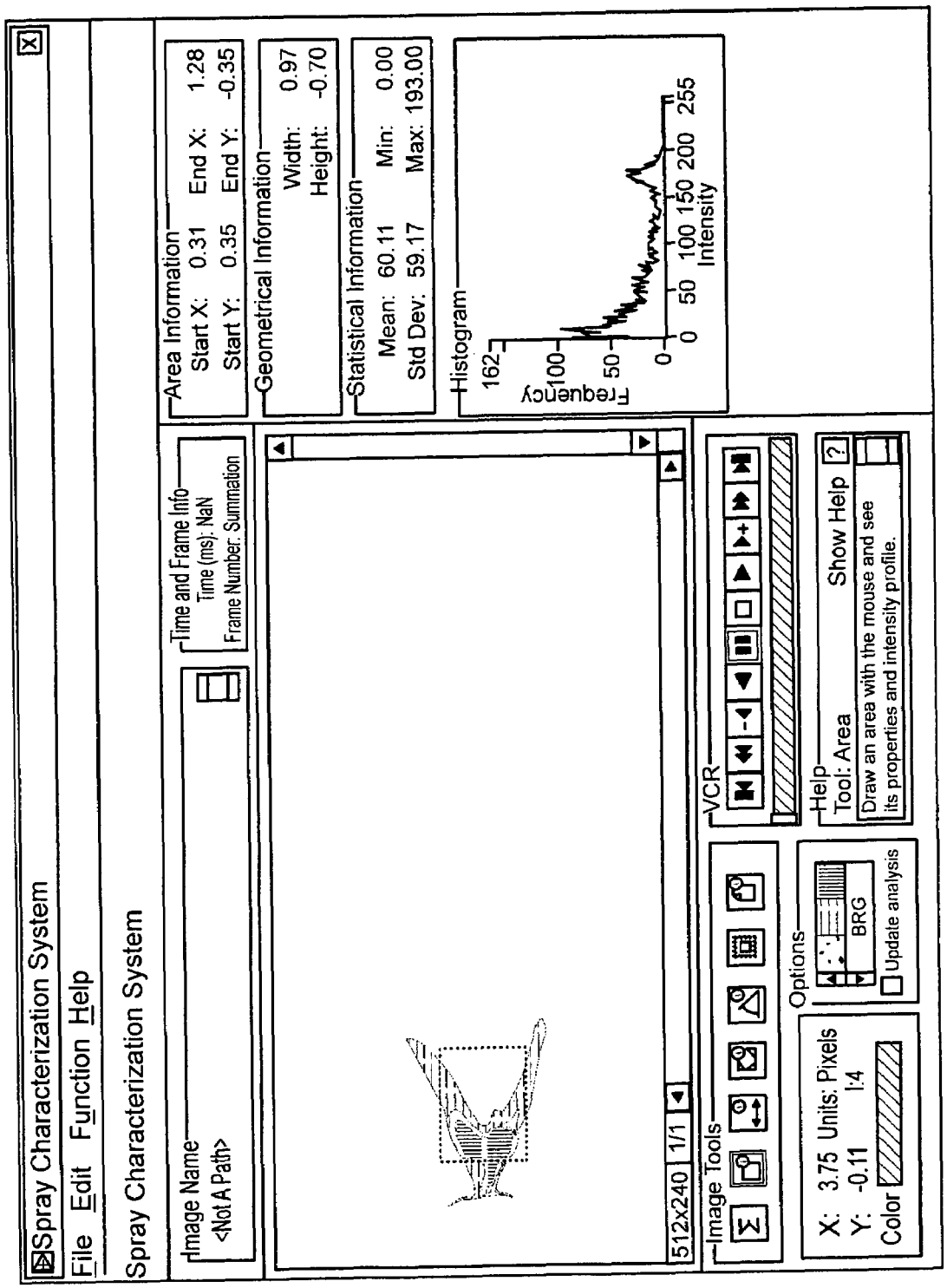
FIG. 4 shows a user-interface screen for quantifying the spray particle intensity distribution inside a "virtual" rectangular area or region of the images depicting the spray plume; and, FIG. 5 shows a user interface screen for quantifying the spray particle intensity across a "virtual" line in the images.

The system may further be used to quantify the particle intensity distribution inside a rectangular area or region of the images. This information can be computed and displayed across "virtual" regions in any number of the images without physically disturbing the flow as shown in FIG. 4. In one preferred embodiment, a user draws (i.e., superimposes upon the image sequence) an area. The system automatically provides the following information regarding the drawn area: the Start X, Y and End X, Y coordinates, Width, Height, statistical information including Mean, Standard Deviation, Minimum and Maximum values and the intensity Histogram. The drawn areas are generally rectangles, although the drawn areas may be selectively restricted to squares or other advantageous shapes for a particular application.

For elliptical areas or regions of the images the system may automatically provide the information about the area major and minor elliptical diameters, angle of the area elliptical axes, geometrical ratio, elliptical ratio, and spray intensity profiles along the major and minor axes. The border of the area may be defined using a spray particle intensity threshold.

Figure 5:
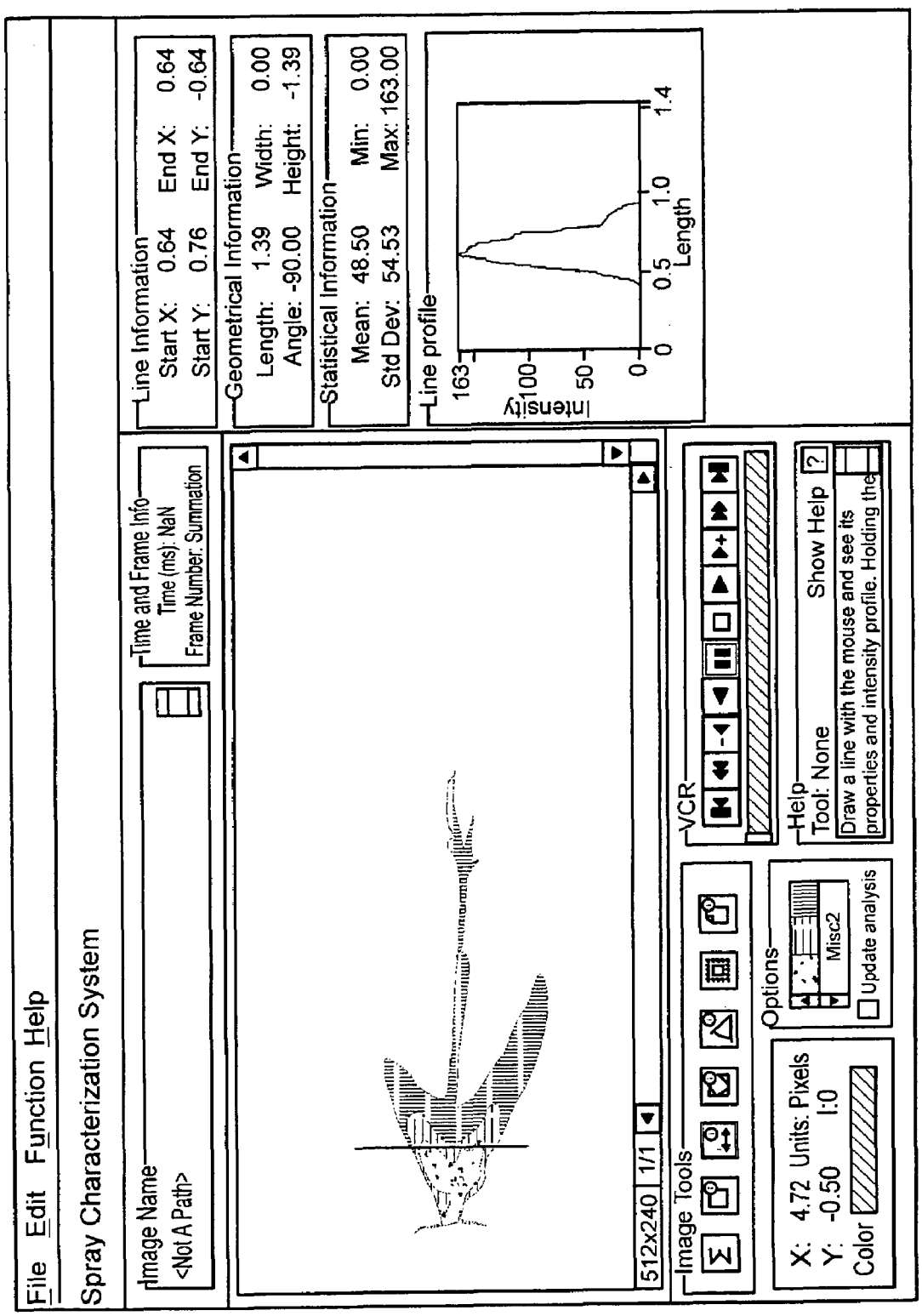

The system may also be used to quantify the spray particle intensity across a "virtual" line in the images without physically disturbing the flow, as shown in FIG. 5, where the "hollow-cone" spray distribution, well known to those in the art, is clearly visible and quantifiable. This "line tool" functions as a "non-disturbing observer" of the particles in the flow. The line tool can be used on one image and then superimposed on other images in the time-evolution to monitor how and where the spray pump distributes particles as a function of time. The system automatically provides the following information once the "virtual" line has been drawn and superimposed upon the image sequence: the Start X, Y, and End X, Y coordinates, Length, Width, Height, Angle (with respect to a reference axis, e. g., the plume central axis), statistical information including Mean, Standard Deviation, Minimum and Maximum values and the particle intensity Profile. The line can be drawn in any orientation and length, although in some embodiments the line definition can be restricted to vertical and horizontal orientation by holding down the SHIFT key before drawing with the cursor.

Appendix A in the U.S. Provisional Application No. 60/149,171 shows an exemplary User's Manual for the invention. Appendix A is a manual for an entire spray characterization system, including information regarding acquisition, processing, set up, calibration, safety issues, et al. Some of the information in the User's Manual is beyond the scope of this specification.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of image analysis comprising:
   providing image data representative of a set of images of a spray plume, each of the images being representative of a density characteristic of the spray plume along a plane that intersects the spray plume; and
   measuring one or more spray plume parameters including a central axis associated with the spray plume within one or more of the images.

2. A method according to claim 1, wherein the one or more parameters further includes an angle measured from the central axis of the spray plume to an outer boundary of the spray plume.

3. A method according to claim 1, wherein the one or more parameters includes one or more cross-sectional axes of the spray plume.

4. A method according to claim 1, further comprising:
   defining a shape on the one or more images so as to delineate an area of the spray plume; and
   measuring one or more spray plume parameters within the area.

5. A method according to claim 4, wherein the spray plume parameters are selected from the group consisting of area start X and Y coordinates, area end X and Y coordinates, area width, area height, mean spray intensity, spray standard deviation, minimum spray intensity, maximum spray intensity, and spray intensity histogram.

6. A method according to claim 4, wherein the spray plume parameters are selected from the group consisting of the area major and minor elliptical diameters, angle of the area elliptical axes, geometrical ratio, elliptical ratio, and spray intensity profiles along the major and minor axes.

7. A method according to claim 4, further comprising using an intensity threshold for defining the borders of the shape.

8. A method according to claim 1, further comprising:
   defining a line on the one or more images so as to delineate an axis of the spray plume; and
   measuring one or more spray plume parameters along the axis.

9. A method according to claim 8, wherein the spray plume parameters are selected from the group consisting of axis start X and Y coordinates, axis end X and Y coordinates, axis length, axis width, axis height, axis angle, mean spray intensity, spray standard deviation, minimum spray intensity, maximum spray intensity, and spray intensity profile.

10. A method according to claim 1, further comprising using one or more calibrating components to associate physical coordinates with image coordinates within each of the set of images.

11. A method according to claim 10, further comprising defining an origin point to associate physical coordinates with image coordinates within each of the set of images.

12. A method according to claim 1, further comprising:
    integrating the set of images so as to exhibit a summary representation of the images; and
    measuring one or more parameters of the summary representation.

13. A method according to claim 12 further comprising:
    providing image data representative of a background image; and
    before integrating the set of images, subtracting the background image from all images in the set of images.

14. A method according to claim 13, wherein the summary representation of images corresponds to an axial cross-sectional density characteristic along a plane substantially normal to a flow direction centerline of the spray plume.

15. A method according to claim 13, wherein the summary representation of images corresponds to a longitudinal density characteristic along a plane substantially parallel to and intersecting a flow direction centerline of the spray plume.

16. A method according to claim 1, wherein at least one of the images corresponds to a cross-sectional density characteristic along a plane substantially normal to a flow direction centerline of the spray plume.

17. A method according to claim 1, wherein at least one of the images corresponds to a longitudinal density characteristic along a plane substantially parallel to and intersecting a flow direction centerline of the spray plume.

18. A method according to claim 1, further comprising
    providing image data representative of a background image; and
    subtracting the background image from at least one image of the set of images.

19. A system for analyzing image data representative of a set of images of a spray plume, each of the images being representative of a density characteristic of the spray plume along a plane that intersects the spray plume, comprising:

a processing device for receiving the set of images; and, a controller, associated with the processing device, that provides a user interface for controlling the processor to measure one or more spray plume parameters including a central axis associated with the spray plume within one or more of the images.

20. A system according to claim 19 wherein the one or more parameters further includes an angle measured from the central axis of the spray plume to an outer boundary of the spray plume.

21. A system according to claim 19, wherein the one or more parameters includes one or more cross-sectional axes of the spray plume.

22. A system according to claim 19, wherein the controller further (i) defines a shape on the one or more images so as to delineate an area of the spray plume, and (ii) measures one or more spray plume parameters within the area.

23. A system according to claim 22, wherein the spray plume parameters are selected from the group consisting of area start X and Y coordinates, area end X and Y coordinates, area width, area height, mean spray intensity, spray standard deviation, minimum spray intensity, maximum spray intensity, and spray intensity histogram.

24. A system according to claim 22, wherein the spray plume parameters are selected from the group consisting of the area major and minor elliptical diameters, angle of the area elliptical axes, geometrical ratio, elliptical ratio, and spray intensity profiles along the major and minor axes.

25. A system according to claim 22, wherein the controller uses an intensity threshold for defining the borders of the shape.

26. A system according to claim 19, wherein the controller further (i) defines a line on the one or more images so as to delineate an axis of the spray plume, and (ii) measures one or more spray plume parameters along the axis.

27. A system according to claim 26, wherein the spray plume parameters are selected from the group consisting of axis start X and Y coordinates, axis end X and Y coordinates, axis length, axis width, axis height, axis angle, mean spray intensity, spray standard deviation, minimum spray intensity, maximum spray intensity, and spray intensity profile.

28. A system according to claim 19, wherein the controller is capable of calibrating components for associating physical coordinates with image coordinates within each of the set of images.

29. A system according to claim 28, wherein the controller is capable of defining an origin point to associate physical coordinates with image coordinates within each of the set of images.

30. A system according to claim 19, wherein the processor further integrates the set of images so as to exhibit a summary representation of the images for measuring one or more parameters of the summary representation.

31. A system according to claim 30 wherein the processor, before integrating the set of images, subtracts a background image from all images in the set of images.

32. A system according to claim 31, wherein the summary representation of images corresponds to an axial cross-sectional density characteristic along a plane substantially normal to a flow direction centerline of the spray plume.

33. A system according to claim 31, wherein the summary representation of images corresponds to a longitudinal density characteristic along a plane substantially parallel to and intersecting the flow direction centerline of the spray plume.

34. A system according to claim 19, wherein at least one of the images corresponds to a cross-sectional density characteristic along a plane substantially normal to a flow direction centerline of the spray plume.

35. A system according to claim 19, wherein at least one of the images corresponds to a longitudinal density characteristic along a plane substantially parallel to and intersecting a flow direction centerline of the spray plume.

36. A system according to claim 19, wherein the processor further subtracts a background image from at least one image of the set of images.

37. A system according to claim 19, wherein the processing device includes a computer system executing software operative to analyze the image data.

38. A method of image analysis comprising:

providing image data representative of a set of images of a spray plume, each of the images being representative of a density characteristic of the spray plume along a plane that intersects the spray plume; and displaying the set of images so as to exhibit a time evolution of the spray plume along the plane.

39. A system for analyzing image data representative of a set of images of a spray plume, each of the images being representative of a density characteristic of the spray plume along a plane that intersects the spray plume, comprising:

a processing device for receiving the set of images; and, a controller, associated with the processing device, that provides a user interface for controlling the processor to display the set of images so as to exhibit a time evolution of the spray plume along the plane.

40. A method of image analysis comprising:

providing image data representative of a set of images of a spray plume, each of the images being representative of a density characteristic of the spray plume along a plane that intersects the spray plume;

measuring one or more spray plume parameters associated with the spray plume within one or more of the images;

defining a line on the one or more images so as to delineate an axis of the spray plume; and measuring one or more spray plume parameters along the axis.

41. A method according to claim 40, wherein the spray plume parameters are selected from the group consisting of axis start X and Y coordinates, axis end X and Y coordinates, axis length, axis width, axis height, axis angle, mean spray intensity, spray standard deviation, minimum spray intensity, maximum spray intensity, and spray intensity profile.

42. A method of image analysis comprising:

providing image data representative of a set of images of a spray plume, each of the images being representative of a density characteristic of the spray plume along a plane that intersects the spray plume;

measuring one or more spray plume parameters associated with the spray plume within one or more of the images; and using one or more calibrating components to associate physical coordinates with image coordinates within each of the set of images.

43. A method according to claim 42, further comprising defining an origin point to associate physical coordinates with image coordinates within each of the set of images.

44. A system for analyzing image data representative of a set of images of a spray plume, each of the images being representative of a density characteristic of the spray plume along a plane that intersects the spray plume, comprising:

a processing device for receiving the set of images; and, a controller, associated with the processing device, that (i) provides a user interface for controlling the processor to measure one or more spray plume parameters associated with the spray plume within one or more of the images, (ii) defines a line on the one or more images so as to delineate an axis of the spray plume, and (iii) measures one or more spray plume parameters along the axis.

45. A system according to claim 44, wherein the spray plume parameters are selected from the group consisting of axis start X and Y coordinates, axis end X and Y coordinates, axis length, axis width, axis height, axis angle, mean spray intensity, spray standard deviation, minimum spray intensity, maximum spray intensity, and spray intensity profile.

46. A system for analyzing image data representative of a set of images of a spray plume, each of the images being representative of a density characteristic of the spray plume along a plane that intersects the spray plume, comprising:

a processing device for receiving the set of images; and, a controller, associated with the processing device, that provides a user interface for controlling the processor to measure one or more spray plume parameters associated with the spray plume within one or more of the images, the controller being capable of calibrating components for associating physical coordinates with image coordinates within each of the set of images.

47. A system according to claim 46, wherein the controller is capable of defining an origin point to associate physical coordinates with image coordinates within each of the set of images.

48. A system for analyzing image data representative of a set of images of a spray plume, each of the images being representative of a density characteristic of the spray plume along a plane that intersects the spray plume, comprising:

a processing device for (i) receiving the set of images, (ii) subtracting a background image from all images in the set of images, and (iii) integrating the set of images so as to exhibit a summary representation of the images for measuring one or more parameters of the summary representation; and a controller, associated with the processing device, that provides a user interface for controlling the processor to measure one or more spray plume parameters associated with the spray plume within one or more of the background images.

\* \* \* \* \*